US011593483B2

(12) United States Patent
Liu et al.

(10) Patent No.: US 11,593,483 B2
(45) Date of Patent: *Feb. 28, 2023

(54) GUARDER: AN EFFICIENT HEAP ALLOCATOR WITH STRONGEST AND TUNABLE SECURITY

(71) Applicant: The Board of Regents of The University of Texas System, Austin, TX (US)

(72) Inventors: Tongping Liu, Belchertown, MA (US); Sam Albert Silvestro, San Antonio, TX (US); Hongyu Liu, Sunnyvale, CA (US); Tianyi Liu, San Antonio, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 583 days.

This patent is subject to a terminal disclaimer.

(21) Appl. No.: 16/656,853

(22) Filed: Oct. 18, 2019

(65) Prior Publication Data

US 2020/0201997 A1 Jun. 25, 2020

Related U.S. Application Data

(60) Provisional application No. 62/781,811, filed on Dec. 19, 2018.

(51) Int. Cl.
*G06F 12/02* (2006.01)
*G06F 21/56* (2013.01)
(Continued)

(52) U.S. Cl.
CPC ............ *G06F 21/566* (2013.01); *G06F 9/485* (2013.01); *G06F 9/5016* (2013.01);
(Continued)

(58) Field of Classification Search
CPC .... G06F 9/485; G06F 9/5016; G06F 12/0646; G06F 12/023; G06F 2212/1052; G06F 2212/083; G06F 21/52; G06F 21/566
(Continued)

(56) References Cited

U.S. PATENT DOCUMENTS

2007/0234296 A1* 10/2007 Zorn .................. G06F 11/1494
717/124
2007/0234297 A1* 10/2007 Zorn .................. G06F 11/3612
717/124
(Continued)

OTHER PUBLICATIONS

Silvestro, Sam, Hongyu Liu, Tianyi Liu, Zhiqiang Lin, and Tongping Liu. "Guarder: A tunable secure allocator." In 27th USENIX Security Symposium (USENIX Security 18), pp. 117-133. 2018. (Year: 2018).*

(Continued)

*Primary Examiner* — Reginald G Bragdon
*Assistant Examiner* — Aaron D Ho
(74) *Attorney, Agent, or Firm* — Smith, Gambrell & Russell LLP (57) ABSTRACT

Memory allocation techniques may provide improved security and performance. A method may comprise mapping a block of memory, dividing the block of memory into a plurality of heaps, dividing each heap into a plurality of sub-heaps, wherein each sub-heap is associated with one thread of software executing in the computer system, dividing each sub-heap into a plurality of bags, wherein each bag is associated with one size class of objects, creating an allocation buffer and a deallocation buffer for each bag, storing a plurality of objects in at least some of the bags, wherein each object is stored in a bag having size class corresponding to a size of the object, storing in the allocation buffer of each bag information relating to available objects
(Continued)

stored in that bag, and storing in the deallocation buffer of each bag information relating to freed objects that were stored in that bag.

18 Claims, 6 Drawing Sheets

(51) Int. Cl.
 *G06F 9/50* (2006.01)
 *G06F 9/48* (2006.01)
 *G06F 12/06* (2006.01)
 *G06F 21/52* (2013.01)

(52) U.S. Cl.
 CPC .......... *G06F 12/0646* (2013.01); *G06F 21/52* (2013.01); *G06F 12/023* (2013.01); *G06F 2212/1052* (2013.01); *G06F 2221/033* (2013.01)

(58) Field of Classification Search
 USPC ........................................................ 711/170
 See application file for complete search history.

(56) References Cited

U.S. PATENT DOCUMENTS

| | | | | |
|---|---|---|---|---|
| 2008/0168552 | A1* | 7/2008 | Devendran | G06F 21/79 726/17 |
| 2010/0211756 | A1* | 8/2010 | Kaminski | G06F 12/023 711/E12.001 |
| 2012/0185700 | A1* | 7/2012 | Vidrine | G06F 21/52 717/148 |
| 2014/0348101 | A1* | 11/2014 | Wang | H04W 88/08 370/329 |
| 2016/0004861 | A1* | 1/2016 | Momot | G06F 21/552 726/23 |
| 2017/0061012 | A1* | 3/2017 | Bortnikov | G06F 16/951 |
| 2018/0052662 | A1* | 2/2018 | Dale | G06F 7/582 |
| 2019/0065152 | A1* | 2/2019 | Jaroch | G06F 7/588 |
| 2019/0073481 | A1* | 3/2019 | Angelino | G06F 8/65 |
| 2020/0026847 | A1* | 1/2020 | Botti | G06F 21/604 |
| 2020/0097392 | A1* | 3/2020 | Pizlo | G06F 12/0826 |

OTHER PUBLICATIONS

Sam Silvestro, Hongyu Liu, Corey Grosser, Zhiqiang Lin, and Tongping Liu. 2017. FreeGuard: A Faster Secure Heap Allocator. In Proceedings of the 2017 ACM SIGSAC Conference on Computer and Communications Security (CCS '17). Association for Computing Machinery, New York, NY, USA, 2389-2403. (Year: 2017).*

Akritidis, Periklis. "Cling: A memory allocator to mitigate dangling pointers." In 19th USENIX Security Symposium (USENIX Security 10). 2010. (Year: 2010).*

Novark, Gene, and Emery D. Berger. "DieHarder: securing the heap." In Proceedings of the 17th ACM conference on Computer and communications security, pp. 573-584. 2010. (Year: 2010).*

Yi Feng and Emery D. Berger. 2005. A locality-improving dynamic memory allocator. In Proceedings of the 2005 workshop on Memory system performance (MSP '05). Association for Computing Machinery, New York, NY, USA, 68-77. DOI:https://doi.org/10.1145/1111583.1111594 (Year: 2005).*

Ram Raghunathan, Stefan K. Muller, Umut A. Acar, and Guy Blelloch. 2016. Hierarchical memory management for parallel programs. In Proceedings of the 21st ACM SIGPLAN International Conference on Functional Programming (ICFP 2016). Association for Computing Machinery, New York, NY, USA, 392-406 (Year: 2016).*

Q. Zeng, M. Zhao and P. Liu, "HeapTherapy: An Efficient End-to-End Solution against Heap Buffer Overflows," 2015 45th Annual IEEE/IFIP International Conference on Dependable Systems and Networks, 2015, pp. 485-496, doi: 10.1109/DSN.2015.54. (Year: 2015).*

Taddeus Kroes, Koen Koning, Erik van der Kouwe, Herbert Bos, and Cristiano Giuffrida. 2018. Delta pointers: buffer overflow checks without the checks. In Proceedings of the Thirteenth EuroSys Conference (EuroSys '18). Association for Computing Machinery, New York, NY, USA, Article 22, 1-14. (Year: 2018).*

Marco-Gisbert, Hector, and Ismael Ripoll. "On the Effectiveness of Full-ASLR on 64-bit Linux." In Proceedings of the In-Depth Security Conference. 2014. (Year: 2014).*

* cited by examiner

GUARDER: AN EFFICIENT HEAP ALLOCATOR WITH STRONGEST AND TUNABLE SECURITY

CROSS-REFERENCE TO RELATED APPLICATIONS

This application claims the benefit of U.S. Provisional Application No. 62/781,811, filed Dec. 19, 2018, the contents of which are incorporated by reference herein in their entirety.

STATEMENT REGARDING FEDERALLY SPONSORED RESEARCH

This invention was made with government support under Grant Number 1566154, awarded by the National Science Foundation. The government has certain rights in the invention.

FIELD OF TECHNOLOGY

The present invention relates to the technical field of memory allocation in software.

BACKGROUND OF THE INVENTION

Many software programs, such as web browsers, network servers, etc., often require dynamically managed heap memory. However, it is very challenging to guarantee heap security. A range of heap vulnerabilities, such as heap overreads, heap over-writes, use-after-frees, invalid-frees, and double-frees, still plague applications written in, for example, the C/C++ languages. Such heap vulnerabilities not only cause unexpected program behavior, but may also lead to security breaches, including information leakage and control flow hijacking. For example, the Heartbleed bug, a buffer over-read problem in the OpenSSL cryptography library, may result in the leakage of sensitive private data. Another example of a recent buffer overflow problem is the WannaCry ransomware attack, which takes advantage of a vulnerability inside the Server Message Block, affecting a series of Windows versions. Heap vulnerabilities still widely exist in different types of in-production software. Table 1 shows some recently reported examples.

TABLE 1

| Vulnerability | Occurrences (#) |
|---|---|
| Heap Overflow | 673 |
| Heap Over-read | 125 |
| Invalid-free | 35 |
| Double-free | 33 |
| Use-after-free | 264 |

Secure memory allocators typically serve as the first line of defense against heap vulnerabilities. However, existing secure allocators, such as the OpenBSD allocator ("OpenBSD"), DieHarder, Cling, and FreeGuard, possess their own deficiencies.

First, these allocators provide either low randomization entropy, or cannot support a stable randomization guarantee, which indicates they may not effectively defend against heap overflows and use-after-free attacks. Cling does not provide any randomization, while FreeGuard only provides two bits of entropy. Although OpenBSD and DieHarder supply higher entropy levels, their entropies are not stable, and vary across different size classes, execution phases, inputs, and applications. Typically, their entropies are inversely proportional to an object's size class. For instance, OpenBSD has the highest entropy for 16 byte objects, with as many as 10 bits, while the entropy for objects with 2048 bytes is at most 3 bits. Therefore, attackers may exploit this fact to breach security at the weakest point.

Second, existing allocators cannot easily change their security guarantees, which prevents users from choosing protection based on their budget for performance or memory consumption. For instance, their randomization entropy is primarily limited by bag size (e.g. DieHarder and OpenBSD), or the number of free lists (e.g. FreeGuard). For instance, simply incrementing FreeGuard's entropy by a single bit may significantly increase memory consumption, due to doubling its number of free lists.

Figure 4:
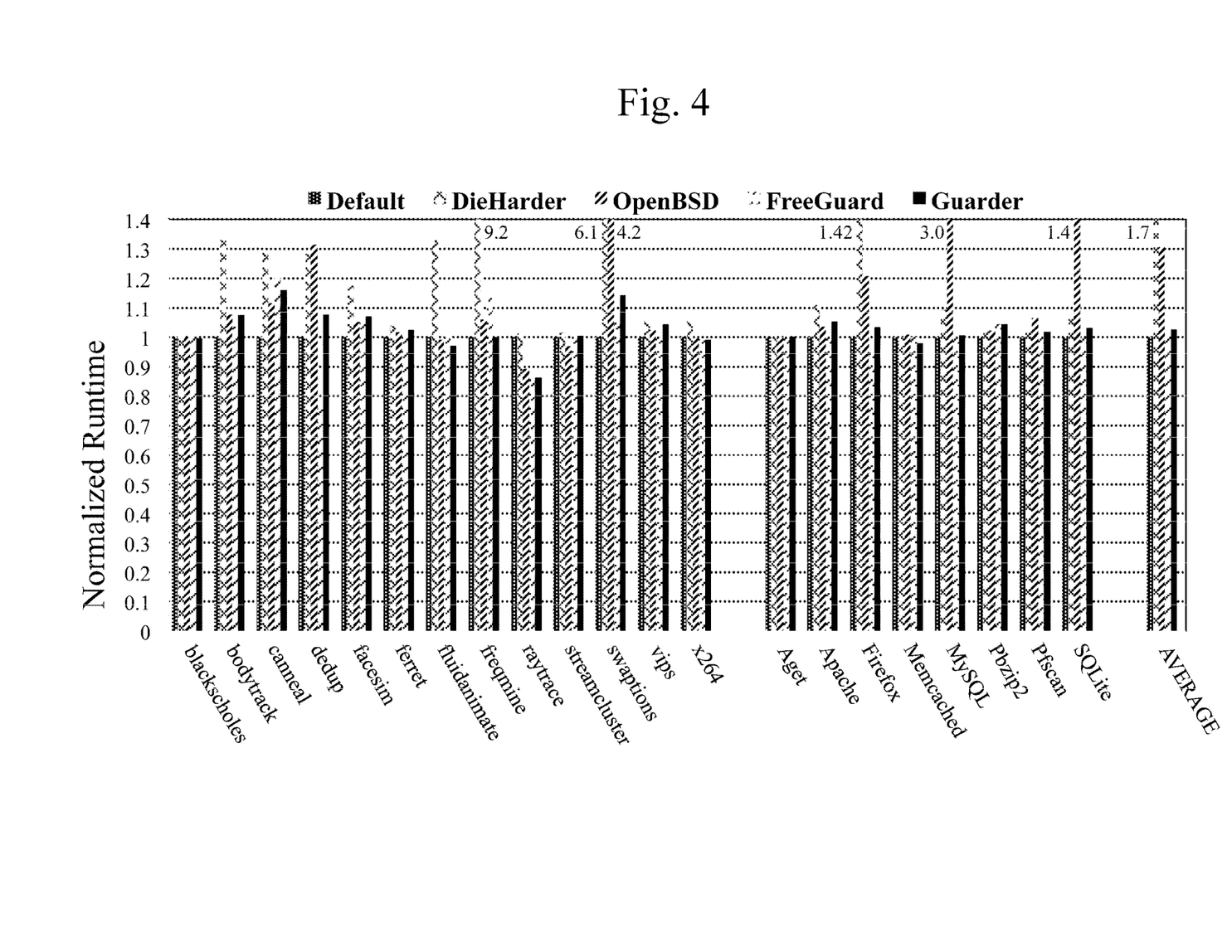
FIG. 4 illustrates an example of performance overhead of secure allocators.

Third, existing secure allocators have other problems that may affect their adoption. Both OpenBSD and DieHarder impose large performance overhead, with 31% and 74% on average. Also, they may slow down some applications by 4× and 9× respectively, as shown in FIG. 4. This prohibitively high overhead may prevent their adoption in performance-sensitive scenarios. On the other hand, although FreeGuard is very efficient, its low entropy and deterministic memory layout make it an easier target to attack.

Accordingly, a need arises for memory allocation techniques that provide improved security and performance.

SUMMARY OF THE INVENTION

The techniques described herein may include memory allocation techniques that provide improved security and performance. For example:

The techniques described herein may provide a novel allocator that provides a strong security guarantee, but without compromising performance. The present techniques may support the necessary security features of existing secure allocators, and may offer improved randomization entropy stably. In addition, the present techniques may allow users to specify their desired security guarantee.

In an embodiment, a method implemented in a computer system including a processor and a memory may comprise mapping a block of memory, dividing the block of memory into a plurality of heaps, dividing each heap into a plurality of sub-heaps, wherein each sub-heap is associated with one thread of software executing in the computer system, dividing each sub-heap into a plurality of bags, wherein each bag is associated with one size class of objects, creating an allocation buffer and a deallocation buffer for each bag, storing a plurality of objects in at least some of the bags, wherein each object is stored in a bag having size class corresponding to a size of the object, storing in the allocation buffer of each bag information relating to available objects stored in that bag, and storing in the deallocation buffer of each bag information relating to freed objects that were stored in that bag.

In embodiments, the method may further comprise randomizing the order of bags within each sub-heap associated with each thread of software executing in the computer system. The method may further comprise randomly inserting a plurality of guard pages within each bag. A number of guard pages to be inserted is customizable. The method may further comprise maintaining object status metadata for each object, in response to allocation of an object by a program, marking the object status metadata for the object as in-use, and in response to deallocation of an object by the program, determining whether the deallocation is invalid or double-free, and when the deallocation is invalid or double-free, halting execution of the program. The method may further comprise maintaining a plurality of bump pointers for each size class of each per-thread heap, which always point to a first never-allocated object.

In an embodiment, a system may comprise a processor, memory accessible by the processor, and program instructions and data stored in the memory, the program instructions executable by the processor to perform: mapping a block of memory, dividing the block of memory into a plurality of heaps, dividing each heap into a plurality of sub-heaps, wherein each sub-heap is associated with one thread of software executing in the computer system, dividing each sub-heap into a plurality of bags, wherein each bag is associated with one size class of objects, creating an allocation buffer and a deallocation buffer for each bag, storing a plurality of objects in at least some of the bags, wherein each object is stored in a bag having size class corresponding to a size of the object, storing in the allocation buffer of each bag information relating to available objects stored in that bag, and storing in the deallocation buffer of each bag information relating to freed objects that were stored in that bag.

In an embodiment, a computer program product may comprise a non-transitory computer readable medium storing program instructions that when executed by a processor perform: mapping a block of memory, dividing the block of memory into a plurality of heaps, dividing each heap into a plurality of sub-heaps, wherein each sub-heap is associated with one thread of software executing in the computer system, dividing each sub-heap into a plurality of bags, wherein each bag is associated with one size class of objects, creating an allocation buffer and a deallocation buffer for each bag, storing a plurality of objects in at least some of the bags, wherein each object is stored in a bag having size class corresponding to a size of the object, storing in the allocation buffer of each bag information relating to available objects stored in that bag, and storing in the deallocation buffer of each bag information relating to freed objects that were stored in that bag.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

Figure 1:
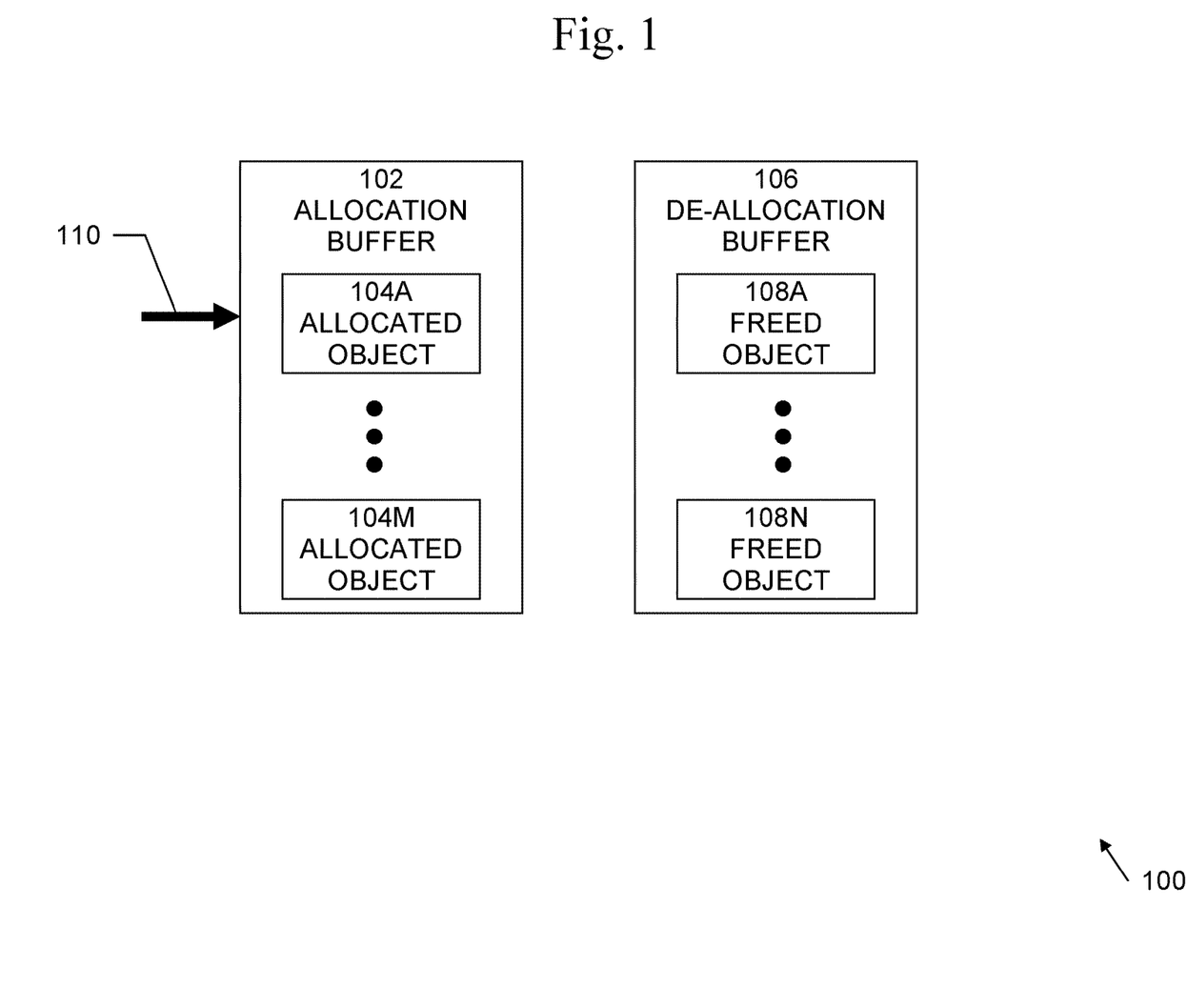
FIG. 1 is an exemplary block diagram of secure allocation memory layout.

An exemplary block diagram of secure allocation memory layout 100 is shown in FIG. 1. Embodiments of the present systems and methods may utilize an allocation buffer 102 to track available objects 104A-M for each size class, then may randomly choose one object from the buffer upon each allocation. The allocation buffer may be dynamically filled using both new and recently-freed objects on-demand, avoiding this decrease of entropy. The allocation buffer may simultaneously satisfy the following properties: (1) The buffer size may be easily adjusted, where a larger size will provide a higher randomization entropy; (2) The buffer size may be defined independently from any size class in order to provide stable entropy for objects of different size classes; (3) It is very efficient to locate an item inside the buffer, even when given an index randomly; (4) It is more efficient to search for an available object by separating available objects from the large amount of in-use ones.

However, although it is possible to place deallocated objects into the allocation buffer directly, it can be very expensive to search for an empty slot in which to do so. In addition, it is difficult to handle a freed object when the allocation buffer is full. Instead, embodiments may utilize a separate deallocation buffer 106 to track freed objects 108A-N: freed objects 108A-N may be recorded into the deallocation buffer 106 sequentially, which will be more efficient due to avoiding the need for searching; these freed objects will be moved to the allocation buffer upon each allocation, and in a batched mode when the allocation buffer is reduced to half-full. More implementation details are described below.

The combination of allocation and deallocation buffers also seamlessly integrates with other customization mechanisms, such as guard pages and overprovisioning. When filling the allocation buffer with new heap objects, embodiments may maintain a bump pointer 110 that always refers to the next new object at the top of the heap. It will skip all objects tied to randomly-selected guard pages (and set them as non-accessible), and randomly skip objects in proportion to the user-defined over-provisioning factor. This mechanism ensures these skipped objects will never participate in future allocations and deallocations.

Embodiments may utilize multiple mechanisms to further improve performance. Embodiments may utilize a novel heap layout to quickly locate the metadata of each freed object in order to detect double and invalid frees. Embodiments may minimize lock acquisitions to further improve scalability and performance. Embodiments may utilize manage pointers to available objects directly within the allocation buffer, removing a level of indirection compared to existing bitmap based (for example, DieHarder or OpenBSD) or free-list-based (for example, FreeGuard) approaches. Embodiments may also overcome the shortcomings of a deterministic layout by constructing per-thread heaps randomly.

Embodiments may provide a stable and tunable security guarantee. For example, customizable security guarantees on randomization entropy, guard pages, and over-provisioning may be provided, which allows users to choose the appropriate security level based on their performance or memory budget. Embodiments may implement a combination of allocation and deallocation buffers to support its customizable security. Embodiments may implement all necessary security features of existing secure allocators, and provides around, for example, 9.89 bits of entropy, while only imposing less than, for example, 3% performance overhead and, for example, 27% memory overhead when compared to the, for example, default Linux allocator.

allocator. For a target program, the present techniques may assume the attacker may obtain the source code of the target program, such that they may know of possible vulnerabilities within. The present techniques may further assume the attackers have no knowledge related to the status of the heap, and cannot take control of the allocator. They cannot utilize a data leakage channel, such as /proc/pid/maps, to discover the location of metadata (in fact, such a leakage channel can be easily disabled). The present techniques may also assume the attackers cannot interfere with the memory management of the allocator, such as by hacking the random generator. Otherwise, they would be able to change the order of memory allocations to increase their predictability.

Given these assumptions, the present techniques may provide defense against a wide range of heap vulnerabilities, such as heap overflows, use-after-frees, double and invalid frees, as well as reduce heap spraying attacks. The present techniques may implement almost all security features of existing secure allocators, as listed in Table 2.

TABLE 2

| Security Features | Security Benefit | DieHarder | OpenBSD | FreeGuard | GUARDER |
|---|---|---|---|---|---|
| BIBOP style | Defends against metadata-based attacks | Has | Has | Has | Has |
| Fully-segregated metadata | Defends against metadata-based attacks | Has | Has | Has | Has |
| Destroy-on-free | Exposes un-initialized reads or use-after-frees | Has | Optional | Optional | Optional |
| Guard pages | Defends against buffer over-reads and over-writes Defends against heap spraying | Weak | Has | Has | Has |
| Randomized allocation | Increases attack complexity of overflows and UAFs | Has | Has | Has | Has |
| Over-provisional allocation | Mitigates harmful effects of overflows | Has | | | Has |
| Check canaries on free | Early detection of overflows | | Weak | Has | Has |
| Randomization entropy* | Increases attack complexity | O(logN) | 2-10 | 2.01 | E |

Heap Vulnerabilities. Heap vulnerabilities that can be defended or reduced by embodiments of the present systems and methods may include buffer overflows, use-after-frees, and double/invalid frees. These memory vulnerabilities can result in information leakage, denial-of-service, illegitimate privilege elevation, or execution of arbitrary code. A buffer overflow occurs when a program reads or writes outside the boundaries of an allocated object, which further includes buffer underflows. Use-after-free occurs when an application accesses memory that has previously been deallocated, and has possibly been reutilized for other live objects. A double-free problem takes place when an object is freed more than once. Finally, an invalid-free occurs when an invalid pointer is passed to heap deallocation functions.

Threat Model—an example of a threat model is as follows. First, assume the underlying OS (for example, Linux, WINDOWS®, etc.) is trusted. However, the ASLR mechanism is not necessarily required to be valid, since embodiments may manage memory allocations using a separate randomization mechanism, making its layout difficult to predict even if ASLR in the underlying OS is broken. Second, assume that the platform will use a 64-bit virtual address space, in order to support the specific layout of this Table 2 shows a comparison of security features of existing secure allocators. Table 2, indicates whether the allocator has the indicated feature, whether the allocator has a weak implementation of the indicated feature, or whether the allocator optionally has the feature.

In embodiments, the only feature disabled by default may be destroy-on-free. This feature may not be necessary, since the strong randomization of embodiments of the present systems and methods will decrease the predictability of every allocation, which will significantly decrease the exploitability of dangling pointers and makes meaningful information leakage much more difficult. Compared to existing solutions, embodiments of the present systems and methods may significantly increase randomization (for example, entropy may be increased by 7.8 bits, over 200 times), may adopt the over-provisional mechanism, and may discard a deterministic layout. Additionally, embodiments of the present systems and methods may support customizable security guarantees, without changing code or recompiling, which allows users to specify their desired level of security by setting the corresponding environment variables.

Embodiments of the present systems and methods, as a shared library, may be preloaded to replace the default allocator, and may intercept all memory management functions of applications automatically. Embodiments may not target support for applications with their own custom allocators, although these applications may be changed to use standard memory functions in order to benefit from the present techniques.

Embodiments of the present systems and methods may employ different mechanisms for managing small and large objects. Embodiments of the present systems and methods may borrow existing mechanisms for handling large objects, but may define large objects as those larger than 512 kilobytes. A major contribution of the present techniques lies in its management of small objects; in fact, most objects belong to this class, and have a dominant impact on application performance.

Figure 2:
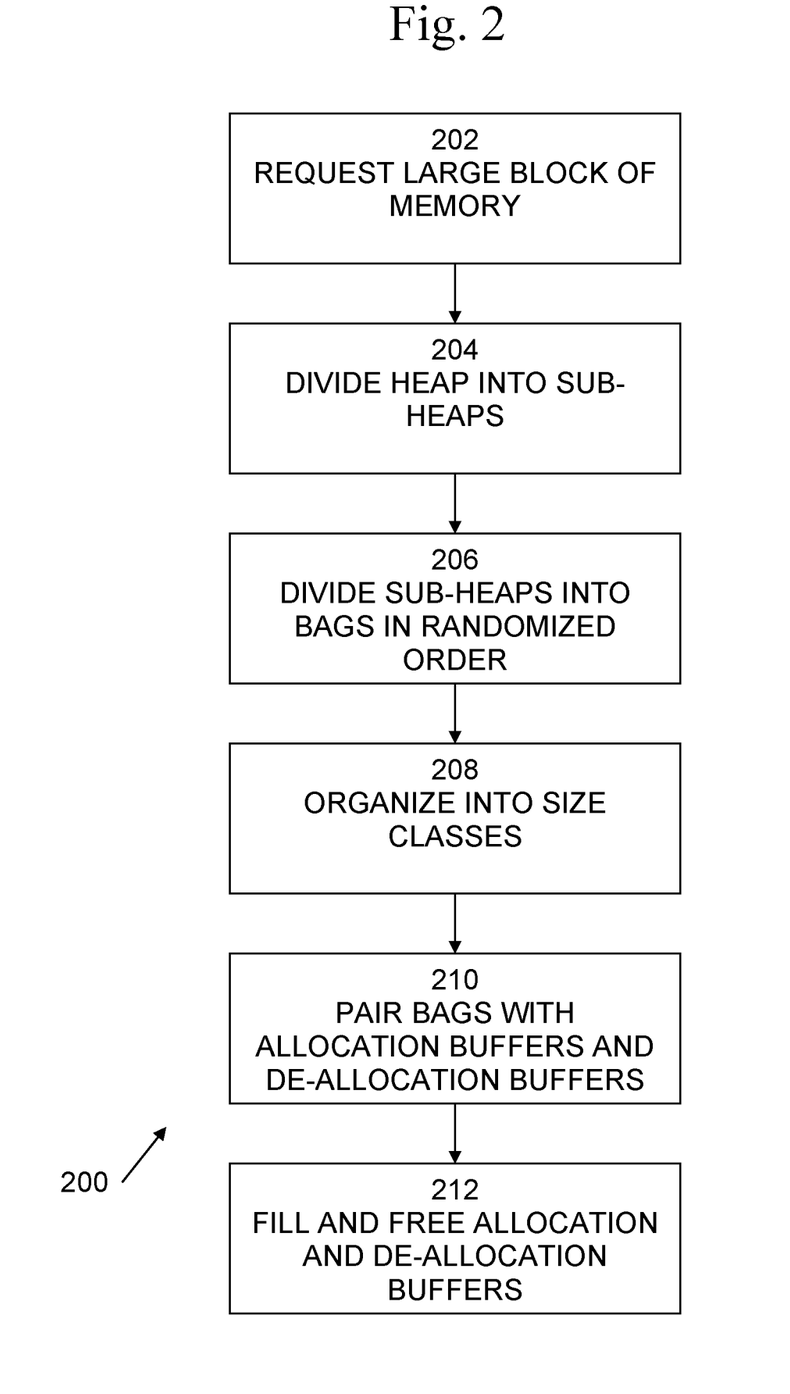
FIG. 2 is an exemplary flow diagram of a secure allocation process.

An exemplary flow diagram of a secure allocation process 200 is shown in FIG. 2. It is best viewed in conjunction with FIG. 3, which is an exemplary block diagram of secure allocator operation 300. In order to reduce the performance overhead caused by a high number of mmap system calls, at 202, embodiments may request a large block of memory once from the underlying OS to serve as the heap 302. Then, at 204, embodiments may divide the heap into multiple per-thread sub-heaps 304-1-304-M. At 206, each sub-heap will be further divided into a set of bags 306 in randomized order, as described below. At 208, objects may be organized into power-of-two size classes 308-1-308-M, starting from, for example, 16 bytes and ending with 512 KB, and places metadata in a separate location. Each bag may have the same size, such as 4 GB. Due to the vast address space of 64-bit machines, the address space should accommodate all types of applications.

Figure 3:
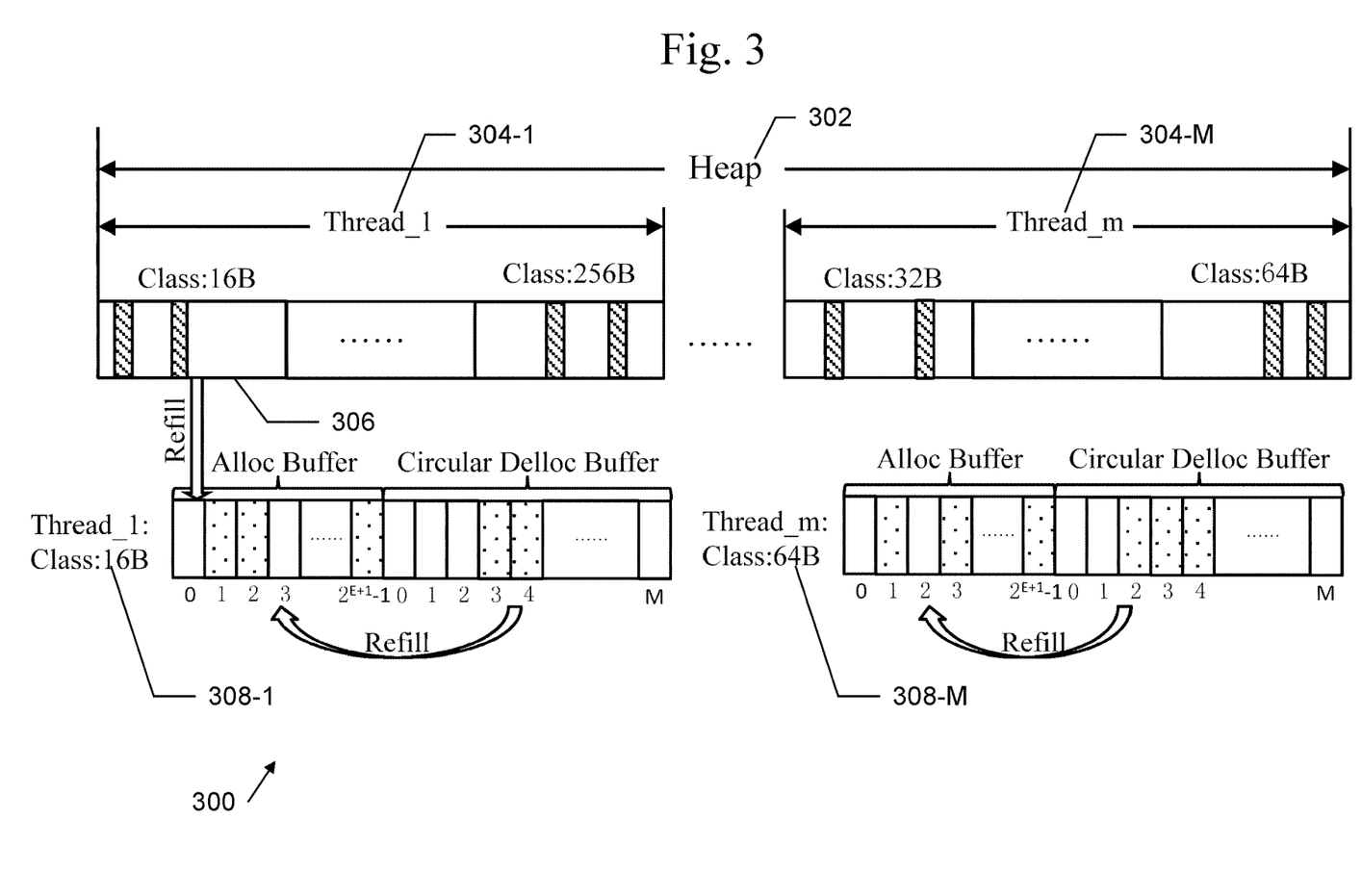
FIG. 3 is an exemplary block diagram of secure allocator operation.

Per-thread design: Embodiments may employ a per-thread heap design such that each thread has its own heap segment, and always returns freed objects to the heap belonging to the current thread. There is no need for embodiments to acquire locks upon allocations and deallocations, which avoids lock acquisition overhead and prevents potential lock contention. However, this design may introduce memory blowup, where memory consumption is unnecessarily increased because freed memory cannot be used to satisfy future memory requests. Embodiments may include mechanisms to alleviate this problem, as described below.

Obfuscating bag order: At 206, embodiments may randomize the order of bags within each per-thread sub-heap. To shuffle the ordering of size classes, embodiments may employ a hash map to manage the relationship between each bag and its metadata. Further, metadata may be randomly allocated using mmap system calls, rather than using a pre-allocated block. More importantly, embodiments may utilize separate allocation and deallocation buffers for each size class of each thread, which is a difference between embodiments of the present systems and methods and other secure allocators. This design allows embodiments to support multiple customizable security features, including the over-provisioning mechanism that, for example, OpenBSD and FreeGuard do not support.

Allocation buffer. At 210, each bag may be paired with an allocation buffer that holds the addresses of available objects in the bag. This allocation buffer may support a user-defined entropy. For example, if E is the desired entropy, then allocating an object randomly from $2^E$ objects will guarantee E bits of entropy.

Embodiments may design the allocation buffer as follows: the allocation buffer capacity may be set to $2^{E+1}$ (not $2^E$), to ensure it will never fall below half-full. This design guarantees one out of at least $2^E$ objects will be chosen randomly upon each allocation request, and reduces the number of filling operations by using double this size. The allocation buffer will be filled by objects from a separate deallocation buffer, described below, or from new heap objects.

Circular deallocation buffer. Further at 210, embodiments may utilize a separate deallocation buffer to track freed objects for a given thread and size class. This design, separating the activities of allocations and deallocations into two different buffers, benefits performance, since freed objects can be recorded sequentially in the deallocation buffer. Because there is no need to search for an available slot, the deallocation step will be completed in constant time.

At 212, the allocation buffer may be filled after each allocation if at least one free object exists in the corresponding deallocation buffer. The empty slot created by the allocation may be filled immediately, which helps reduce the number of trials needed to find an available object during allocations. The allocation buffer may also be filled when the number of available objects falls below $2^E$, in order to ensure the randomization guarantee. In this case, freed objects from the deallocation buffer will be utilized first, followed by those from a global object buffer. If this is still insufficient, new objects from the associated per-thread heap may be imported. This design helps minimize the number of searches upon each allocation, since the allocation buffer will never be less than half-full.

Defending Against Different Attacks. Embodiments may defend against heap vulnerabilities by employing a combination of multiple mechanisms.

Defending exploits of buffer overflows. Embodiments may defend against the exploitation of buffer overflows in several ways. First, its strong randomization makes attacks much more difficult, since attackers must know the target chunk addresses at which to issue attacks. When objects are highly randomized, it is extremely difficult to know where an allocation will be satisfied, even if source code is available. Second, over-provisioning may tolerate overflows landing on unused objects, thus nullifying them. Third, guard pages can thwart overflow attempts. Finally, if some attacks modify the canaries placed at the end of each object, embodiments may detect such attacks.

Defending exploits of use-after-frees. Similarly, embodiments may defend against such exploits in multiple ways. First, embodiments may separate the metadata from the actual heap, making it impossible to issue use-after free attacks on free list pointers. Second, its strong randomization makes meaningful attacks extremely difficult, with only a 0.11% success rate per try due to its 9.8 bits of entropy, as evaluated in Section 5.4. Since each subsequent free is a Bernoulli trial following a geometric distribution, it is expected to achieve the first successful attack after 891 tries. Finally, unsuccessful attacks may crash programs incidentally, due to guard pages placed inside, therefore the brute-force approach may not easily succeed.

Defending exploits of double and invalid frees. As discussed above, embodiments may detect against every double and invalid free, due to its custom allocator. Therefore, embodiments may choose to stop the program immediately or skip these invalid operations. Therefore, embodiments may defend against such vulnerabilities.

Implementation Details. Embodiments may support different security mechanisms based on the unique design of allocation and deallocation buffers. Additionally, embodiments may support certain optimizations to further reduce performance overhead and memory blowup.

Customizable Randomization Entropy. Embodiments may support customizable randomization to meet the various performance and security requirements of different users. As described above, this mechanism may be achieved by altering the number of entries in each allocation buffer. For example, 9 bits of entropy may be chosen by default, which guarantees that the number of available objects will never be less than 512 ($2^9$), where each buffer has 1024 entries.

Object selection may be performed as follows: upon every allocation, a random index into the allocation buffer is generated. It will then acquire the object address stored at this index, if the object is available. If the index refers to an empty slot (i.e., contains a null value), the allocator will initiate a forward search starting from the selected index. The required number of searches is expected to be around two on average, given the fact that the allocation buffer is never less than half-full. However, this is actually not true due to certain worst cases. Therefore, the allocation buffer may be divided into, for example, eight separate regions, and may record the number of available objects within each. Thus, an entire region may be skipped if no objects are present.

Customizable Over-Provisioning. Over-provisioning is a technique in which a certain number of heap objects are designated as never-to-be used. Therefore, an overflow that occurs in a place containing no useful data can easily be tolerated. Embodiments may implement over-provisioning by controlling the filling step of allocation buffers. For example, the over-provisioning factor may be set to ⅛ by default, resulting in ⅛ of objects from each bag being skipped. This also indicates that a given object may be pulled into the corresponding allocation buffer with a likelihood of 87.5%. However, the naive method of computing and comparing probabilities for each object is too expensive. Instead, embodiments may utilize an associated overprovisional buffer, with a capacity equal to half the allocation buffer, in which new objects from a given bag are first placed. Then, the specified proportion, for example, ⅛ of these objects will be deleted from this buffer randomly, and will never participate in future allocations or deallocations. This method may reduce the amount of computing and comparing by ⅞ compared to the naive method. Embodiments utilizing the overprovisional mechanism may significantly reduce their memory footprint and cache loadings, since "skipped" objects will never be accessed in the future.

Customizable Guard Pages. Embodiments may place guard pages within each bag to thwart overflow or heap spraying attacks. In contrast, existing techniques, such as DieHarder cannot place guard pages internally, since every heap object has some probability of being utilized. For this reason, DieHarder has a "weak implementation" listed under "Guard Pages" in Table 2, as it cannot stop heap spraying or buffer overflow attacks that only occur within each bag. OpenBSD designs each bag to occupy a single page, which practically places guard pages between bags.

Embodiments may support a flexible ratio of guard pages, obtained from an environment variable. When pulling from new heap objects during the filling procedure, embodiments may randomly choose which pages to protect, in proportion to this value. For size classes less than one page, all objects within the page may be protected. If a size class exceeds one page, then multiple pages (equaling the size class) may be protected in order to not change the mapping between objects and their metadata.

Detecting Double and Invalid Frees. Embodiments may detect double and invalid frees by employing an additional status byte associated with each object. The object status metadata for each bag are located in a separate area. For each allocation, embodiments may mark its status as in-use. Upon deallocation, embodiments may first compute the index of its status byte, then confirm whether it is an invalid or double-free. If so, it will stop the program immediately; otherwise, it will update the status accordingly. Embodiments may detect all double and invalid frees. Due to complexities brought by memalign, embodiments may treat any address within a valid object as a valid free, and consequently frees the object.

Checking Canaries on Free. Embodiments may also utilize canaries to help thwart buffer overflow attacks. A single byte placed at the end of every object may be reserved for use as a canary. This byte may be located beyond the boundary of the size requested by the application. Upon deallocation, this byte's value may be inspected; if modified, this serves as evidence of a buffer overflow. Then, embodiments may immediately halt the execution and report to the user. Embodiments may additionally check the canary values of an object's four adjacent neighbors at the same time, which provides additional protection for long-lived objects that may never be freed by the application.

Optimizations. Embodiments may utilize multiple optimizations to further reduce its performance and memory overhead. To this end, embodiments may also employ, for example, the Intel SSE2-optimized fast random number generator (RNG).

Accessing Per-Thread Data. Embodiments may access a per-thread heap upon every allocation and deallocation. Therefore, it is important for embodiments to quickly access per-thread data. However, the implementation of Thread Local Storage (TLS) (declared using the "_thread" storage class keyword) is not efficient, and introduces at least an external library call, a system call to obtain the thread ID, and a table lookup. Instead, embodiments may employ the stack address to determine the index of each thread and fetch per thread data quickly. Embodiments may allocate a large block of memory that will be utilized for threads' stack areas. Upon thread creation, embodiments may assign a specific stack area to each thread, such as its thread index multiplied by 8 MB. Then, embodiments may obtain the thread index quickly by dividing any stack offset by 8 MB.

Reducing Startup Overhead. In order to support a specified randomization entropy, embodiments may initialize each allocation buffer with $2^{E+1}$ objects, then place the specified ratio of guard pages within. However, some applications may only utilize a subset of size classes, which indicates that the time spent placing guard pages in unused bags is wasted. Therefore, embodiments may employ on-demand initialization and only initialize the allocation buffer and installs guard pages upon the first allocation request for the bag.

Reducing Memory Consumption. To reduce memory consumption, embodiments may return memory to the underlying OS when the size of a freed object is larger than, for example, 64 kilobytes, by invoking, for example, madvise with the MADV_DONTNEED flag. Embodiments may design a global deallocation buffer to reduce the memory blowup caused by returning freed objects to the current thread's sub-heap. This problem is serious for producer-consumer applications, since new heap objects would continually be allocated by the producer. If a thread's deallocation buffer reaches capacity, the thread will attempt to donate a portion of its free objects to a global deallocation buffer. Conversely, when a thread has no freed objects in its deallocation buffer, embodiments may first pull objects from the global deallocation buffer before attempting to utilize new heap objects.

Experimental Evaluation. Exemplary experiments were performed on a 16-core machine, installed with INTEL XEON® CPU E5-2640 processors. This machine has 256 GB of main memory and 20 MB of shared L3 cache, while each core has a 256 KB L1 and 2 MB L2 cache. The underlying OS is Linux-4.4.25. All applications were compiled using GCC-4.9.1, with -O2 and -g flags.

The default settings for each allocator were utilized, except where explicitly described. By default, embodiments may use 9 bits of randomization entropy, a 10% proportion of random guard pages, and a ⅛ over-provisioning factor. OpenBSD's object junking feature was disabled in order to provide a fair comparison.

In order to evaluate the performance and memory overhead of these allocators, experiments were performed on a total of 21 applications, including 13 PARSEC applications, as well as Apache httpd-2.4.25, Firefox-52.0, MySQL-5.6.10, Memcached-1.4.25, SQLite-3.12.0, Aget, Pfscan, and Pbzip2. Note that Firefox uses an allocator based on jemalloc by default, although all figures and tables label it as "Linux" in this section. Single-threaded applications, such as SPEC CPU2006, were not evaluated due to the following reasons. First, multithreaded applications have become the norm, resulting from ubiquitous multicore hardware. Second, allocators such as DieHarder and OpenBSD have a severe scalability issue, which cannot be observed using single threaded applications.

Performance Overhead. To evaluate performance, the average results of 10 executions were utilized, as shown in FIG. 4, which shows the performance overhead of secure allocators, where all values are normalized to the default Linux allocator. DieHarder's destroy-on-free feature was disabled to allow for comparison with embodiments of the present systems and methods. A value larger than 1.0 represents a runtime slower than the Linux allocator, while those below 1.0 are faster. On average, the performance overhead of these secure allocators are: DieHarder-74%, OpenBSD-31%, FreeGuard-1%, and embodiments of the present systems and methods-3% by comparing to the Linux allocator, while a known performance oriented allocator—TCMalloc—is slightly faster, with 1.6% performance improvement. That is, embodiments of the present systems and methods may impose negligible performance overhead, while providing the strongest security guarantee. Embodiments of the present systems and methods may have performance overhead similar to FreeGuard, but with much higher randomization entropy and support for heap over-provisioning, as evaluated and described below. Embodiments of the present systems and methods run faster than DieHarder and OpenBSD, and why it is comparable to FreeGuard were investigated. Two factors may significantly affect the performance of allocators.

System call overhead. The first factor is the overhead of system calls related to memory management. These include mmap, mprotect, madvise, and munmap, however, this data was omitted due to space limitations. Based on the evaluation, while the actual data is omitted due to the space limit, embodiments of the present systems and methods and FreeGuard impose much less overhead from mmap system calls, since they obtain a large block of memory initially in order to reduce the number of mmap calls. Although they impose more mprotect calls, this evaluation indicates that mprotect requires only about 1/20 the time needed to perform an mmap system call.

Heap allocation overhead. The overhead associated with heap allocations was also evaluated by focusing on the number of searches/trials performed during allocations and deallocations, as well as the number of synchronizations. An allocator will impose more overhead when the number of searches/trials is larger. Similarly, if the number of synchronizations (mostly lock acquisitions) is larger, the allocator will also impose more overhead.

The average number of trials for allocations and deallocations of each allocator is shown in Table 3, where the Linux allocator and TCMalloc typically only require a single trial upon each allocation and deallocation. These values were computed by dividing the total number of trials by the number of allocations or deallocations. For both allocations and deallocations, FreeGuard only requires a single trial due to its free-list-based design. In comparison, embodiments may make random selections from allocation buffers that are consistently maintained to remain at least half-full. As a consequence, the average number of allocation "tries" of embodiments may be about 1.77. Both OpenBSD and DieHarder exceed this value, at 3.79 and 1.99, respectively. For each deallocation, DieHarder performs 12.4 trials, while OpenBSD, FreeGuard, and embodiments may only require a single trial. This large number of trials is a major reason why DieHarder performs much worse than other secure allocators. During each deallocation, DieHarder will compare against all existing minibags one-by-one to locate the specific minibag (and mark its bit as free inside), loading multiple cache lines unnecessarily. Embodiments may utilize a special design (see FIG. 2) to avoid this overhead.

TABLE 3

| Trials | | DieHarder | OpenBSD | FreeGuard | Present Embodiments |
|---|---|---|---|---|---|
| Allocation | Average | 1.99 | 3.79 | 1 | 1.77 |
| | Maximum | 93 | 45 | 1 | 131 |
| Deallocation | Average | 12.40 | 1 | 1 | 1 |
| | Maximum | 141 | 1 | 1 | 1 |

Synchronization overhead can be indicated by the number of allocations, as shown in Table 4. For the other secure allocators, each allocation and deallocation should acquire a lock, although FreeGuard will have less contention. In comparison, embodiments may avoid most lock acquisitions by always returning freed objects to the current thread's deallocation buffer. Embodiments may only involve lock acquisitions when using the global deallocation buffer, employed to reduce memory blowup (described above). This indicates that embodiments may actually imposes less synchronization overhead than FreeGuard, which is part of reason why GUARDER has a similar overhead to FreeGuard, while providing a higher security guarantee.

Performance Sensitivity Studies. Further evaluation was performed into how sensitive performance of embodiments of the present systems and methods are to different customizable factors, such as the randomization entropy, the proportion of each bag dedicated to random guard pages, and the level of heap overprovisioning. The average results of all applications were shown in Table 4, which shows the performance sensitivity to each parameter, normalized to the default settings of embodiments of the present system and methods and in which EB=Entropy Bits, GPR=Guard Page Ratio, and OPF=Over-Provisioning Factor. In Table 4, the data is normalized to that of the default setting: 9 bits of randomization entropy, 10% guard pages, and ⅛ of over-provisioning factor.

TABLE 4

| Entropy (bits) GPR = 10%, OPF = ⅛ | | | | |
|---|---|---|---|---|
| 8 | 9 | 10 | 11 | 12 |
| 1.003 | 1.000 | 1.016 | 1.031 | 1.047 |
| Guard Page Ratio EB = 9, OPF = ⅛ | | | | |
| 2% | 5% | 10% | 20% | 50% |
| 0.987 | 0.990 | 1.000 | 1.016 | 1.046 |
| Over-provisioning Factor EB = 9, GPR = 10% | | | | |
| 1/32 | 1/16 | ⅛ | ¼ | ½ |
| 0.998 | 0.995 | 1.000 | 1.001 | 1.011 |

Randomization Entropy. Different randomization entropies were evaluated, ranging from 8 to 12 bits. As shown in Table 4, a higher entropy, indicating it is harder to be predicted and more secure, typically implies a higher performance overhead. For instance, 12 entropy bits may impose 4.7% performance overhead when comparing to the default setting. With a higher entropy, deallocated objects have a lower chance to be re-utilized immediately, which may access more physical memory unnecessarily, causing more page faults and less cache hits.

not as large as expected, as over-provisioning will not affect cache utilization when skipped objects are completely removed from future allocations and deallocations. However, it may cause a much larger performance impact on DieHarder.

Memory Overhead. Maximum memory consumption information was collected for all five allocators. For server applications, such as MySQL and Memcached, memory consumption was collected via the VmHWM field of /proc/pid/status file. For other applications, memory consumption was collected using the maxresident output of the time utility. To ensure a fair comparison, the canary checking functionality was disabled for both FreeGuard and embodiments of the present systems and methods (and is disabled by default in OpenBSD), since adding even a single-byte canary may cause an object to be allocated from the next largest size class.

In total, the memory overhead (shown in Table 5) of FreeGuard is around 37%, while DieHarder and OpenBSD feature slightly less memory consumption than the Linux allocator, with −3% and −6%, respectively. Embodiments may impose 27% memory overhead on evaluated applications, when using the default 9 bits of entropy. It especially imposes more than 4× memory overhead for Swaptions, MySQL, and SQLite.

TABLE 5

| Application | Allocations (#) | Deallocations (#) | Memory Usage (MB) | | | | |
|---|---|---|---|---|---|---|---|
| | | | Linux | DieHarder | OpenBSD | FreeGuard | GUARDER |
| blackscholes | 18 | 14 | 627 | 634 | 628 | 630 | 655 |
| bodytrack | 424519 | 424515 | 34 | 42 | 32 | 63 | 111 |
| canneal | 30728189 | 30728185 | 963 | 1153 | 828 | 932 | 1186 |
| dedup | 4045531 | 1750969 | 1684 | 1926 | 1020 | 2693 | 1474 |
| facesim | 4729653 | 4495883 | 327 | 377 | 324 | 374 | 491 |
| ferret | 137968 | 137960 | 66 | 94 | 71 | 100 | 132 |
| fluidanimate | 229992 | 229918 | 213 | 270 | 235 | 237 | 477 |
| freqmine | 456 | 347 | 1543 | 1344 | 1426 | 1631 | 1885 |
| raytrace | 45037352 | 45037316 | 1162 | 1724 | 1111 | 1511 | 1770 |
| streamcluster | 8908 | 8898 | 111 | 114 | 111 | 117 | 149 |
| swaptions | 48001811 | 48000397 | 6 | 12 | 7 | 12 | 383 |
| vips | 1422138 | 1421738 | 32 | 37 | 32 | 820 | 104 |
| x264 | 71120 | 71111 | 491 | 506 | 497 | 494 | 604 |
| Aget | 49 | 24 | 69 | 59 | 32 | 51 | 82 |
| Apache | 102216 | 101919 | 4 | 5 | 2 | 6 | 12 |
| Firefox | 20874509 | 20290076 | 159 | 163 | 169 | 163 | 172 |
| Memcached | 7601 | 76 | 6 | 8 | 4 | 7 | 13 |
| MySQL | 491544 | 491433 | 126 | 135 | 277 | 158 | 535 |
| Pbzip2 | 67 | 61 | 97 | 102 | 99 | 261 | 105 |
| Pfscan | 51 | 15 | 753 | 800 | 837 | 803 | 798 |
| SQLite | 1458486 | 1458447 | 41 | 64 | 35 | 125 | 331 |
| Normalized Total | | | 1.00 | 0.97 | 0.94 | 1.37 | 1.27 |

Guard Page Ratio. A higher ratio of guard pages will have a higher chance to stop any brute-force attacks. The performance effects of different ratios of random guard pages, including 2%, 5%, 10%, 20%, and 50%, were similarly evaluated. For the 50% ratio, almost every page (or object with size greater than 4 kilobytes), will be separated by a guard page. Similarly, a larger ratio of installed guard pages typically implies a larger performance overhead, due to invoking more mprotect system calls.

Over-provisioning factor. Different heap over-provisioning factors, including 1/32, 1/16, ⅛, ¼, and ½, were evaluated. In the extreme case of ½, half of the heap will not be utilized. This evaluation shows two results: (1) A larger over-provisioning factor will typically imply larger overhead. (2) The performance impact of over-provisioning is Memory overhead of embodiments on certain applications may be attributed to multiple reasons, mostly relating to its management of small objects. First, embodiments may increase memory consumption due to its randomized allocation. For any given size class, embodiments may place more than $2^n$ objects into the allocation buffer, then randomly allocate an object from among them. Therefore, embodiments may access other pages (due to the randomized allocation policy) when there are still available/free objects in existing pages. Second, the over-provisional mechanism may introduce more memory consumption, since some objects will be randomly skipped and thus never utilized. Note that embodiments may also achieves comparable average memory overhead to FreeGuard, due to its global free cache mechanism, which better balances memory usage among threads (particularly for producer-consumer patterns).

Memory overhead of embodiments may be near 0% when 7 bits of entropy are utilized. This further indicates the advantage of providing customizable security, as users may choose a lower entropy to reduce performance and memory consumption as needed.

typically result in a program crash. Heartbleed is unique in that it results in the silent leakage of heap data. Embodiments of the present systems and methods were shown to avoid the ill effects of these bugs, and/or report their occurrences to the user, as shown in Table 6, which shows effectiveness evaluation on known vulnerabilities. More information about these buggy applications is described below.

TABLE 6

| Application | Vulnerability | Original | DieHarder | OpenBSD | FreeGuard | GUARDER |
|---|---|---|---|---|---|---|
| bc-1.06 | Buffer Over-write | Crash | No crash | No crash | No crash | No crash |
| ed-1.14.1 | Invalid-Free | Crash | No crash | Halt→report | Halt→report | Halt→report |
| gzip-1.2.4 | Buffer Over-write | Crash | No crash | No crash | p-protect | p-protect |
| Heartbleed | Buffer Over-read | Data Leak | Data Leak | Data Leak | p-protect | p-protect |
| Libtiff-4.0.1 | Buffer Over-write | Crash | No crash | Crash | Halt→report | Halt→report |
| PHP-5.3.6 | Use-After-Free | Crash | No crash | Halt→report | Halt→report | Halt→report |
| | Use-After-Free | Crash | No crash | Halt→report | Halt→report | Halt→report |
| | Double-Free | Crash | No crash | Halt→report | Halt→report | Halt→report |
| polymorph-0.4.0 | Buffer Overflow | Crash | No crash | No crash | p-protect | p-protect |
| Squid-2.3 | Buffer Overflow | Crash | No crash | No crash | Halt→report | Halt→report |

No crash: Program completes normally
Halt→report: Halts execution & reports to user
Data Leak: Leakage of arbitrary heap data occurred
p-protect: Probabilistic protection, p = 0.10 (default)

Randomization Entropy. The randomization entropies of the secure allocators was further evaluated, with results shown in FIG. 5. In the example shown in FIG. 5, the average randomization entropies of existing secure allocators, grouped by object size class are shown. The entropies of each size class was experimentally evaluated by explicitly modifying the allocators. The basic idea is to update a per-size class global variable upon each allocation, then compute the average entropy of each size class for different applications. The entropy was computed based on the maximum number of available choices upon each allocation using a $\log_2(N)$ formula. Note that the maximum number of entries was utilized in four bags to compute the entropy for OpenBSD upon each allocation. Because the bag size for OpenBSD is just one page, the entropies are not shown for objects larger than 4 kilobytes.

Figure 5:
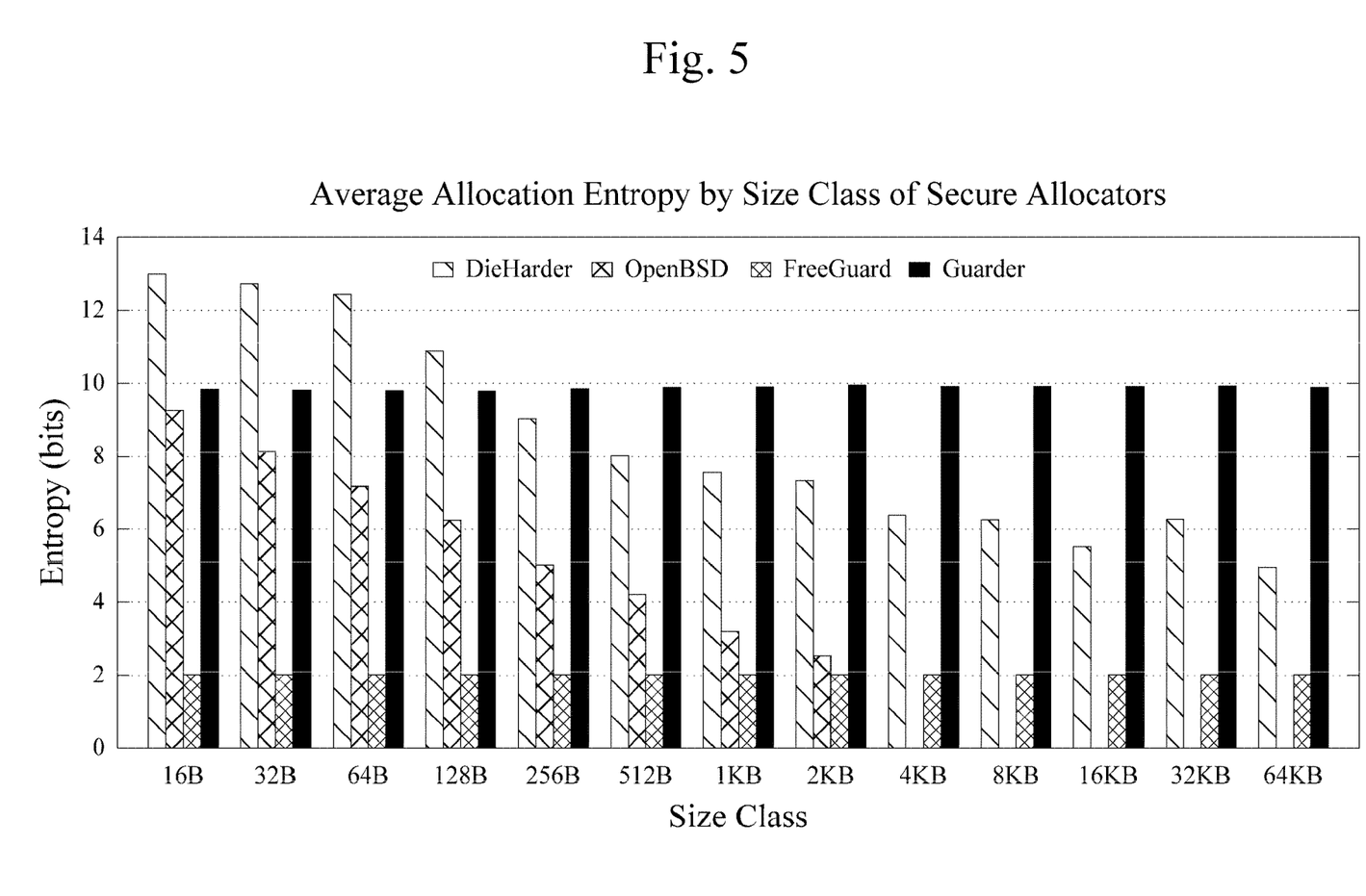
FIG. 5 illustrates an example of average randomization entropies of existing secure allocators.

Both DieHarder and OpenBSD were seen to exhibit unstable entropy, and FreeGuard shows a constant low entropy (approximately 2 bits). By contrast, the measured entropy of embodiments of the present systems and methods is >9.89 bits for every size class, when the specified entropy is set to 9 bits. Taking the size class of 64 kilobytes for example, embodiments may randomly allocate one object from over 831 objects, while DieHarder and FreeGuard will allocate from just 32 and 4 objects, respectively. This indicates that embodiments of the present systems and methods may have significantly higher security than these existing allocators. DieHarder only exceeds the entropy of embodiments of the present systems and methods in the first four size classes, when compared to its default configuration with 9 bits. However, this evaluation also shows that embodiments may guarantee virtually the same high entropy across different size classes, execution phases, applications, or inputs, providing improved security.

Effectiveness of Defending Against Attacks. The effectiveness of embodiments of the present systems and methods and other allocators was evaluated using a collection of real-world vulnerabilities, including buffer over-writes, buffer over-reads, use-after frees, and double/invalid frees. With the exception of Heartbleed, each of the reported bugs will bc-1.06. Arbitrary-precision numeric processing language interpreter. The affected copy of this program was obtained from BugBench, and includes a buffer overflow as the result of an off-by-one array indexing error, caused by a specific bad input, which will produce a program crash. Based on their powers-of-two size classes, each secure allocator places the affected array in a bag serving objects larger than the needed size. As such, this small one element overflow is harmlessly contained within unused space, thus preventing the crash. ed-1.14.1. Line-oriented text editor ed contains a simple invalid-free bug, caused by a call to free( ) that was forgotten by the developer after moving a buffer from dynamic to static memory. Embodiments may guarantee detection of all double/invalid free problems, and thus provides an immediate report of the error, including the current call stack.

gzip-1.2.4. GNU compression utility. Gzip, obtained from BugBench, contains a stack based buffer overflow. For testing purposes, it was moved to the heap. This bug would normally corrupt the adjacent metadata, however, when testing each secure allocator, this crash is avoided due to their metadata segregation. Additionally, around 10% of tests of embodiments and FreeGuard resulted in halting execution, caused by accessing an adjacent random guard page.

Libtiff-4.0.1. TIFF image library A malformed input will cause the affected version of Libtiff's gif2tiff converter tool to experience a buffer overflow, normally resulting in a program crash. When verifying this bug with embodiments, this will always result in (1) an immediate halt due to illegal access on an adjacent random guard page, or (2) a report to the user indicating the discovery of a modified canary value. OpenBSD aborts with a "chunk info corrupted" error, while DieHarder produces no report and exits normally.

Heartbleed. Cryptographic library. The Heartbleed bug exploits a buffer over-read in OpenSSL-1.0.1f. Both embodiments and FreeGuard will probabilistically guard against this attack, with protection in proportion to the amount of random guard pages installed. By default, this is 10%. Neither OpenBSD nor DieHarder can provide protection against this bug.

PHP-5.3.6. Scripting language interpreter. A variety of malicious XML data are provided as input, resulting in use-after-free and double-free conditions. Embodiments, FreeGuard, and OpenBSD halt and report each of these bugs, while DieHarder exits normally with no report made.

polymorph-0.4.0. File renaming utility The affected version of polymorph suffers from a stack based buffer overflow that was adapted to the heap for testing purposes, and results in a program crash due to corrupted object metadata. Due to their segregated metadata, all of the secure allocators allow the application to exit normally. However, both embodiments and FreeGuard also provide probabilistic protection in proportion to the amount of installed random guard pages.

Squid-2.3. Caching Internet proxy server Squid 2.3 contains a heap-based buffer overflow caused by an incorrect buffer size calculation. Normally, this bug will cause the program to crash due to corrupting adjacent metadata. When tested with embodiments, the overwritten canary value at the site of the overflow is detected, and the program is immediately halted. FreeGuard exhibits similar behavior, while OpenBSD and DieHarder do not detect the overflow at all.

Conclusion: For all evaluated bugs, embodiments were capable of either probabilistically detecting the attack—such as through the use of random guard pages to thwart buffer overflow—or immediately provided a report to the user when the error condition occurred (e.g., double-free). However, the results of embodiments and FreeGuard are very similar. Based on the investigation, these evaluated bugs (mostly static) cannot show the benefit of the improved security of embodiments, as described below, such as higher entropy and over-provisioning. For instance, it is not easy to evaluate higher randomization entropy providing more resistance to attacks, but in reality, it does. Additionally, for example, if a one-element overflow is already contained within unused space, over-provisioning provides no additional benefit.

Customization (a) Why is Customization Helpful? Embodiments may support customizable security. Based on the evaluation above, higher security may come at the cost of increased performance overhead and memory consumption. Sometimes, this difference could be sufficiently large that it may affect users' choices. For instance, the memory overhead of embodiments using 7 bits of entropy is around 0% (not shown due to space limitations), while its memory overhead with 9 bits is around 27%. Therefore, users may choose a level of security that reduces memory consumption when required by resource-constrained environments, such as mobile phones. Embodiments may provide this flexibility without changing implementation.

(b) How many bits of entropy could embodiments support? Embodiments may support up to, for example, 16 bits of entropy on machines with 48 address bits, although with the potential of higher overhead. In the example shown in FIG. 3, the number of supported threads may limit entropy choices, since there are 16 bags in each thread, and every bag has the same size. If there are 128 threads in total, with a heap space of 128 terabytes, every bag will be 64 gigabytes, which can support up to 16 bits of entropy. Since there is room for at most 217 objects of size 512 kilobytes in such a bag, it may only support 16 bits of entropy if over-provisioning and guard pages are also supported. In embodiments, each bag may be allocated on-demand, and may use different bag sizes, in order to support even higher levels of entropy.

Embodiments may utilize the combination of allocation and deallocation buffers to support different customizable security guarantees, including randomization entropy, guard pages, and over-provisioning. Embodiments may implement almost all security features of other secure allocators, while only imposing less than, for example, 3% performance overhead, and featuring comparable memory overhead.

Figure 6:
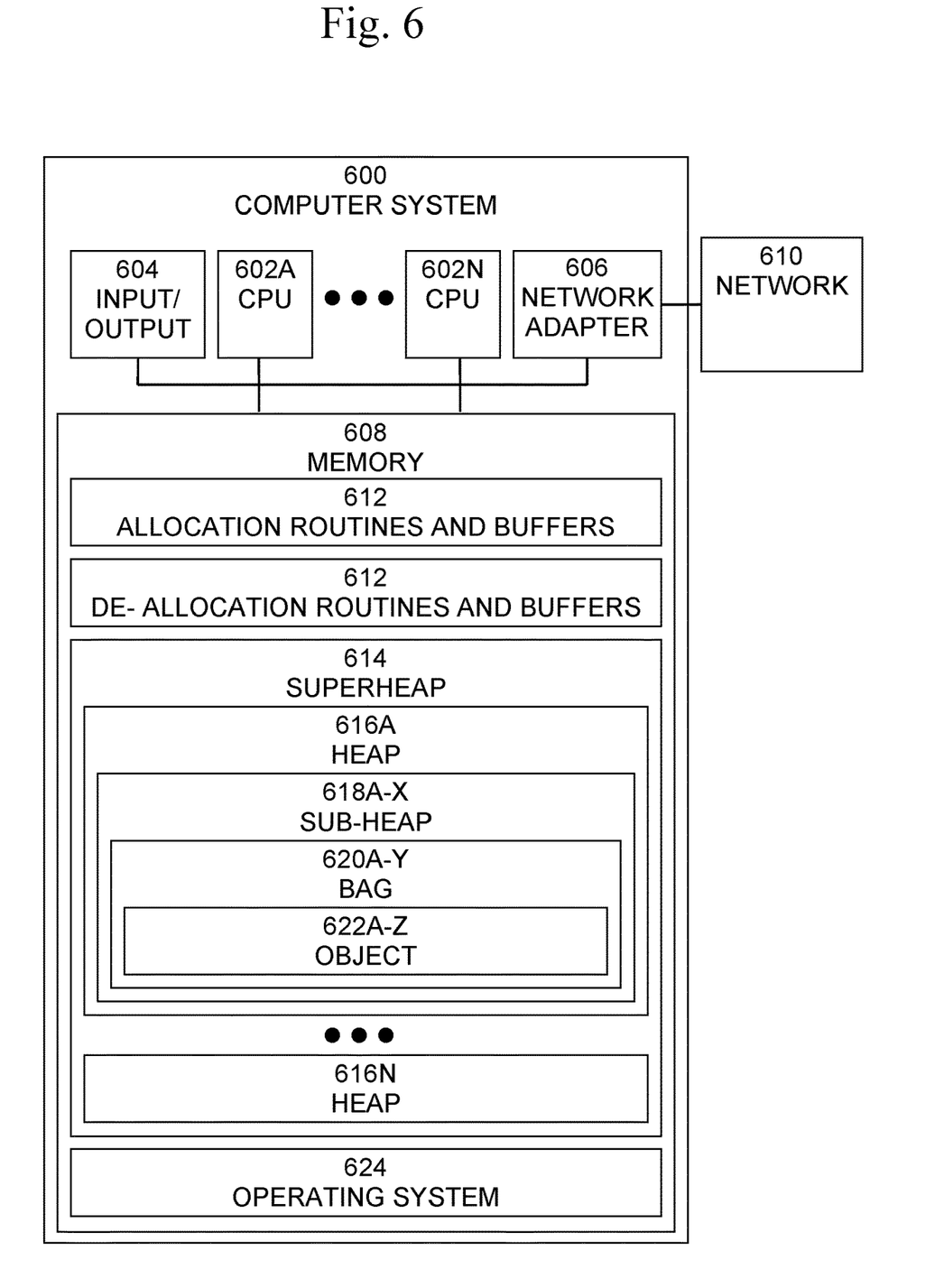
FIG. 6 is an exemplary block diagram of a computer system in which embodiments of the present techniques may be implemented.

An exemplary block diagram of a computer system 600, in which entities and processes involved in the embodiments described herein may be implemented, is shown in FIG. 6. Computer system 600 may typically be implemented using one or more programmed general-purpose computer systems, such as embedded processors, systems on a chip, personal computers, workstations, server systems, and minicomputers or mainframe computers, or in distributed, networked computing environments. Computer system 600 may include one or more processors (CPUs) 602A-602N, input/output circuitry 604, network adapter 606, and memory 608. CPUs 602A-602N execute program instructions in order to carry out the functions of the present communications systems and methods. Typically, CPUs 602A-602N are one or more microprocessors, such as an INTEL CORE® processor.

FIG. 6 illustrates an embodiment in which computer system 600 is implemented as a single multi-processor computer system, in which multiple processors 602A-602N share system resources, such as memory 608, input/output circuitry 604, and network adapter 606. However, the present communications systems and methods also include embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 600 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather distributed among a plurality of systems or devices, based on well-known engineering considerations. The present communications systems and methods may include any and all such arrangements.

In the example shown in FIG. 6, memory 608 may include allocation routines and buffers 612, de-allocation routines and buffers 613, superheap 614, and operating system 620. Allocation routines 612 may include software routines and memory buffers to perform processing to implement memory allocation according to the present techniques as described above. De-allocation routines 613 may include software routines and memory buffers to perform processing to implement memory de-allocation according to the present techniques as described above. Superheap 614 may include a top layer memory chunk that contains one or more heap structures 616A-N. Each heap 616A-N may include a plurality of sub-heap memory structures 618A-X. A heap may be a collection of data from many threads, with each thread having a dedicated sub-heap 618A-X. Each sub-heap 618A-X may include a plurality of bag memory structures 620A-Y. Each bag 620A-Y may hold a plurality of objects 622A-Z, with each bag holding objects of the same size class. Operating system 620 may provide overall system functionalities.

As shown in FIG. 6, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it.

Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. Thus, it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e. g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system, computer program product, and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U. S. C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A method implemented in a computer system including a processor and a memory, the method comprising:
    mapping a block of memory;
    dividing the block of memory into a plurality of heaps;
    dividing each heap into a plurality of sub-heaps, wherein each sub-heap is associated with one thread of software executing in the computer system;
    dividing each sub-heap into a plurality of bags, wherein each bag is associated with one size class of objects;
    creating an allocation buffer and a deallocation buffer for each bag;
    setting a capacity for each allocation buffer to $2^{E+1}$ wherein E is a customizable value of a randomization entropy;
    storing a plurality of objects in at least some of the bags, wherein each object is stored in a bag having size class corresponding to a size of the object;
    storing in the allocation buffer of each bag information relating to available objects stored in that bag; and
    storing in the deallocation buffer of each bag information relating to freed objects that were stored in that bag.

2. The method of claim 1, further comprising:
    randomizing the order of bags within each sub-heap associated with each thread of software executing in the computer system.

3. The method of claim 1, further comprising: randomly inserting a plurality of guard pages within each bag, wherein a number of guard pages to be inserted is customizable.

4. The method of claim 3, wherein an over-provisioning factor defines a fraction of heap objects from each bag which are skipped and which never participate in any future allocations or deallocations.

5. The method of claim 1, further comprising:
maintaining object status metadata for each object;
in response to allocation of an object by a program, marking the object status metadata for the object as in-use; and
in response to deallocation of an object by the program, determining whether the deallocation is invalid or double-free, and when the deallocation is invalid or double-free, halting execution of the program.

6. The method of claim 4, further comprising:
maintaining a plurality of bump pointers for each size class of each per-thread heap, which always point to a first never-allocated object.

7. A system comprising a processor, memory accessible by the processor, and program instructions and data stored in the memory, the program instructions executable by the processor to perform:
mapping a block of memory;
dividing the block of memory into a plurality of heaps;
dividing each heap into a plurality of sub-heaps, wherein each sub-heap is associated with one thread of software executing in the computer system;
dividing each sub-heap into a plurality of bags, wherein each bag is associated with one size class of objects;
creating an allocation buffer and a deallocation buffer for each bag;
setting a capacity for each allocation buffer to $2^{E+1}$ wherein E is a customizable value of a randomization entropy;
storing a plurality of objects in at least some of the bags, wherein each object is stored in a bag having size class corresponding to a size of the object;
storing in the allocation buffer of each bag information relating to available objects stored in that bag; and
storing in the deallocation buffer of each bag information relating to freed objects that were stored in that bag.

8. The system of claim 7, further comprising:
randomizing the order of bags within each sub-heap associated with each thread of software executing in the computer system.

9. The system of claim 7, further comprising: randomly inserting a plurality of guard pages within each bag, wherein a number of guard pages to be inserted is customizable.

10. The system of claim 9, wherein an over-provisioning factor defines a fraction of heap objects from each bag which are skipped and which never participate in any future allocations or deallocations.

11. The system of claim 7, further comprising:
maintaining object status metadata for each object;
in response to allocation of an object by a program, marking the object status metadata for the object as in-use; and
in response to deallocation of an object by the program, determining whether the deallocation is invalid or double-free, and when the deallocation is invalid or double-free, halting execution of the program.

12. The system of claim 10, further comprising:
maintaining a plurality of bump pointers for each size class of each per-thread heap, which always point to a first never-allocated object.

13. A computer program product comprising a non-transitory computer readable medium storing program instructions that when executed by a processor perform:
mapping a block of memory;
dividing the block of memory into a plurality of heaps;
dividing each heap into a plurality of sub-heaps, wherein each sub-heap is associated with one thread of software executing in the computer system;
dividing each sub-heap into a plurality of bags, wherein each bag is associated with one size class of objects;
creating an allocation buffer and a deallocation buffer for each bag;
setting a capacity for each allocation buffer to $2^{E+1}$ wherein E is a customizable value of a randomization entropy;
storing a plurality of objects in at least some of the bags, wherein each object is stored in a bag having size class corresponding to a size of the object;
storing in the allocation buffer of each bag information relating to available objects stored in that bag; and
storing in the deallocation buffer of each bag information relating to freed objects that were stored in that bag.

14. The computer program product of claim 13, further comprising:
randomizing the order of bags within each sub-heap associated with each thread of software executing in the computer system.

15. The computer program product of claim 13, further comprising:
randomly inserting a plurality of guard pages within each bag, wherein a number of guard pages to be inserted is customizable.

16. The computer program product of claim 15, wherein an over-provisioning factor defines a fraction of heap objects from each bag which are skipped and which never participate in any future allocations or deallocations.

17. The computer program product of claim 13, further comprising:
maintaining object status metadata for each object;
in response to allocation of an object by a program, marking the object status metadata for the object as in-use; and
in response to deallocation of an object by the program, determining whether the deallocation is invalid or double-free, and when the deallocation is invalid or double-free, halting execution of the program.

18. The computer program product of claim 16, further comprising:
maintaining a plurality of bump pointers for each size class of each per-thread heap, which always point to a first never-allocated object.

* * * * *